US005774060A

United States Patent [19]

Ostermann et al.

[11] Patent Number: 5,774,060

[45] Date of Patent: Jun. 30, 1998

[54] MOTOR-VEHICLE CENTRAL LOCK SYSTEM WITH TRANSPONDER IN KEY

[75] Inventors: Wilfried Ostermann, Essen; Fred Welskopf, Herne, both of Germany

[73] Assignee: Kiekert AG, Heilingenhaus, Germany

[21] Appl. No.: 705,693

[22] Filed: Aug. 27, 1996

Related U.S. Application Data

[63] Continuation-in-part of Ser. No. 457,730, Jun. 1, 1995, Pat. No. 5,561,420.

[30] Foreign Application Priority Data

Aug. 16, 1994 [DE] Germany .......................... 44 28 947.2
Sep. 8, 1995 [DE] Germany .......................... 195 33 195.8

[51] Int. Cl.[6] .......................... G06F 7/04

[52] U.S. Cl. .......................... 340/825.31; 340/825.54; 70/256; 307/10.5

[58] Field of Search .......................... 340/825.31, 825.34, 340/825.32, 825.54, 825.69, 825.72, 426, 572; 307/10.2, 10.3, 10.5; 180/287; 70/278, 256, 257

[56] References Cited

U.S. PATENT DOCUMENTS

| | | | |
|---|---|---|---|
| 4,471,343 | 9/1984 | Lemelson | 340/825.31 |
| 4,818,855 | 4/1989 | Mongeon et al. | 340/825.54 |
| 4,825,210 | 4/1989 | Bachhuber et al. | 340/825.31 |
| 4,928,098 | 5/1990 | Dannhaeuser | 340/825.69 |
| 5,365,225 | 11/1994 | Bachhuber | 340/825.31 |
| 5,365,235 | 11/1994 | Kennedy et al. | 340/825.54 |
| 5,477,214 | 12/1995 | Bartel | 340/825.31 |

*Primary Examiner*—Edwin C. Holloway, III
*Attorney, Agent, or Firm*—Herbert Dubno; Andrew Wilford

[57] ABSTRACT

A lock system has a remote operator, a lock provided with a switch actuatable by a key part of the operator, a central controller in the vehicle connected to elements of the vehicle for actuating same, a receiver, and a transceiver. The operator is separate from the motor vehicle and has the key part, an energy source, a transmitter powered by the energy source and actuatable to transmit a main signal containing a current main code word, and a transponder substantially independent of the transmitter and of the energy source for receiving an interrogation signal and thereupon generating a callback signal containing a callback code word. When the receiver in the motor vehicle receives the transmitted code work it sends a release signal to the controller. Alternately the transceiver can, when the switch is actuated, generate the interrogation signal, receive the callback signal, and send a release signal to the controller when the callback signal corresponds to the predetermined callback code word. After exchange of the energy source or something else that causes a lose of synchronization the key part is inserted in the lock to actuate the switch to generate the interrogation signal and initiate a time window of a predetermined length. The transmitter then is actuated to generate a main signal including a new current code word. The new main code is received by the receiver during the time window and the stored code word in the receiver is reset to the received new main code word.

3 Claims, 3 Drawing Sheets

MOTOR-VEHICLE CENTRAL LOCK SYSTEM WITH TRANSPONDER IN KEY

SPECIFICATION

CROSS REFERENCE TO RELATED APPLICATION

This application is a continuation-in-part of application Ser. No. 08/457,730 filed 1 Jun. 1995, now U.S. Pat. No. 5,561,420, with a claim to the priority of German P 44 28 947.2 filed 16 Aug. 1994.

FIELD OF THE INVENTION

The present invention relates to a high-security remotely operable motor-vehicle lock system. More particularly this invention concerns a central lock system operable by a key.

BACKGROUND OF THE INVENTION

In the above-cited parent application a motor-vehicle central lock system is described having a remote operator separate from the motor vehicle and having a key part having a predetermined bitting, a transmitter actuatable to transmit a main signal containing a main code word, and a transponder substantially independent of the transmitter for receiving an interrogation signal and thereupon generating a callback signal containing a callback code word. A lock provided with a switch is actuatable mechanically by the key part with the predetermined bitting to operate the switch. A central controller in the vehicle is connected to elements of the vehicle for actuating same. A receiver in the motor vehicle connected to the controller receives the main signal including the main code word, extracts the main code word from the transmitted main signal, compares the extracted main code word with a predetermined main code word, and sends a release signal to the controller when the extracted main code word corresponds to the predetermined main code word to actuate the elements. A transceiver in the motor vehicle is connected to the controller for, when the switch is actuated, generating the interrogation signal, receiving the callback signal containing the callback code word, extracting the callback code word from the callback signal, comparing the extracted callback code word with a predetermined callback code word, and sending a release signal to the controller when the extracted callback code word corresponds to the predetermined callback code word to actuate the elements and set in the transponder a new callback code word based on the main code word.

Thus with this system if the transmitter fails or gets desynchronized from the receiver, the operator is inserted into the lock like a key and its transponder is interrogated. The mechanical bitting, which can be standard up-and-down key bits or transparent regions on the key, serves merely to enable generation of the interrogation signal which in turn is tested by the transponder so that it responds with the appropriate callback signal only when the correct interrogation signal is received. Only when the transceiver receives the correct callback signal can the release signal be sent to the controller to operate some element of the vehicle, normally the door latches and/or the ignition. The interrogation signal can be related to the changing main code word, that is include all or part of it or be related to it by some factor, for instance as a function of time passed since the last actuation.

The transmitter according to this earlier invention is provided with a power source and the transponder is wholly passive and has an antenna by means of which it receives power from the transceiver only when in the lock. The transponder therefore will always be available to emit its callback signal which is stored in nonvolatile memory along with the interrogation signal it is waiting for to send out the callback signal. Typically the transponder has a plastic housing under whose surface is imbedded a coil serving as antenna and energy pickup, and the lock is similarly constructed so that it can transmit energy to and receive signals from the transponder. It is also within the scope of the invention to provide an actual plug-and-socket connection between the transponder on the key and the one lock to power the transponder and exchange signals between the transponder and the transceiver.

According to another feature of the earlier invention the system includes door latches connected electrically but not mechanically to the lock. This provides a very high level of security since even if the lock is forced, it will not be able to electrically trigger the latches.

As described in copending application Ser. No. 08/098,481 the transmitter in accordance with this invention includes a code register capable of outputting a predetermined sequence of code words and steppable through the sequence to output the code words sequentially one at a time, a clock connected to the register for periodically stepping it through the code-word sequence, and output means for modulating a signal with the code word currently is outputted by the register and for transmitting the modulated signal as the main signal. The receiver similarly includes a code register like the transmitter code register, capable of outputting the predetermined sequence of code words, and steppable through the sequence to output the code words sequentially one at a time, a clock like the transmitter clock and connected to the receiver code register for periodically stepping it through the code-word sequence substantially synchronously with the transmitter clock and transmitter register, and input means connected to the receiver code register and to the controller for receiving and demodulating a transmitted main signal, extracting a main code word from the demodulated signal, comparing the extracted main code word with the code word currently is generated by the receiver code register, and generating a release signal and sending it to the controller when the extracted code word not only corresponds to a code word in the code-word sequence but also lies no more than a predetermined number of code words in the sequence away from the code word currently is outputted by the receiver code register. This system alone offers a high degree of security that is doubled by the second code system employed when the key/operator is actually inserted into the lock. Normally it must be inserted in the ignition lock to start the car, although insertion into the door lock is not necessary to open the vehicle.

The lock system further has according to the earlier invention a random-number generator having an output and energizeable to produce a random number corresponding to one of the code words at its output, and an initializer for at least temporarily connecting the output of the random-number generator to both of the registers for resetting same to output the code word corresponding to the random number of the generator.

In addition connection means, such as a serial-port interface, is provided between the transmitter and transponder for feeding to the transponder an auxiliary code word associated with the current main code word in the transmitter. The auxiliary code word represents the current state of the clock of the transmitter. Thus the callback code word can be a function of how much time has passed since the last actuation of the transmitter, a piece of information that an unauthorized user could hardly obtain.

The problem with this arrangement is that it can be somewhat complex to resynchronize the transmitter and receiver when, for instance, the transmitter's battery has been replaced. The procedure is somewhat complex and therefore a considerable detriment to the system.

OBJECTS OF THE INVENTION

It is therefore an object of the present invention to provide an improved method of operating a central lock system of the above-described type.

Another object is the provision of such an improved method of operating a central lock system of the above-described type which overcomes the above-given disadvantages, that is which allows the transmitter and receiver to be resynchronized easily.

SUMMARY OF THE INVENTION

A motor-vehicle lock system has a remote operator, a lock provided with a switch actuatable by a key part of the operator, a central controller in the vehicle connected to elements of the vehicle for actuating same, a receiver, and a transceiver. The operator is separate from the motor vehicle and has the key part having a predetermined bitting, an energy source, a transmitter powered by the energy source and actuatable to transmit a main signal containing a current main code word, and a transponder substantially independent of the transmitter means and of the energy source for receiving an interrogation signal and thereupon generating a callback signal containing a callback code word. The receiver in the motor vehicle connected to the controller receives the main signal including the main code word, extracts the current main code word from the transmitted main signal, compares the extracted current main code word with a predetermined stored main code word, and sends a release signal to the controller when the extracted current main code word corresponds to the predetermined stored main code word to actuate the elements. The transceiver in the motor vehicle is connected to the controller for, when the switch is actuated, generating the interrogation signal, receiving the callback signal containing the callback code word, extracting the callback code word from the callback signal, comparing the extracted callback code word with a predetermined callback code word, and sending a release signal to the controller when the extracted callback code word corresponds to the predetermined callback code word to actuate the elements and setting tin the transponder a new callback code word based on the main code word. According to the method of the invention after exchange of the energy source or something else that causes a lose of synchronization the key part is inserted in the lock to actuate the switch to generate the interrogation signal in the transceiver, generate the callback signal in the operator, receive the callback signal in the receiver means, extract the callback code word, compare the extracted callback code word, and, on correspondence with the extracted callback code word with the predetermined callback code word, initiate a time window of a predetermined length. The transmitter then is actuated to generate within the time window a main signal including a new current code word. The new main code is received by the receiver during the time window and the stored code word in the receiver is reset to the received new main code word.

Thus on loss of synchronization, for instance after the replacement of the battery in the operator, the user inserts the operator in the lock, turns or pushes it to actuate the switch, and then pushes the transmitter button to emit a new signal that the receiver is automatically reset to. This is a very simple procedure that nonetheless in no way reduces the security of the system, since it can only be done by a properly bitted and programmed key. Even assuming a would-be thief were able to reproduce the key's bitting and generate an acceptable code-word signal, there is no way such an unauthorized user could know the next code word in the sequence for a subsequent actuation.

According to the invention the receiver only resets the stored code word to the new main code word when the central controller is in a locked position.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
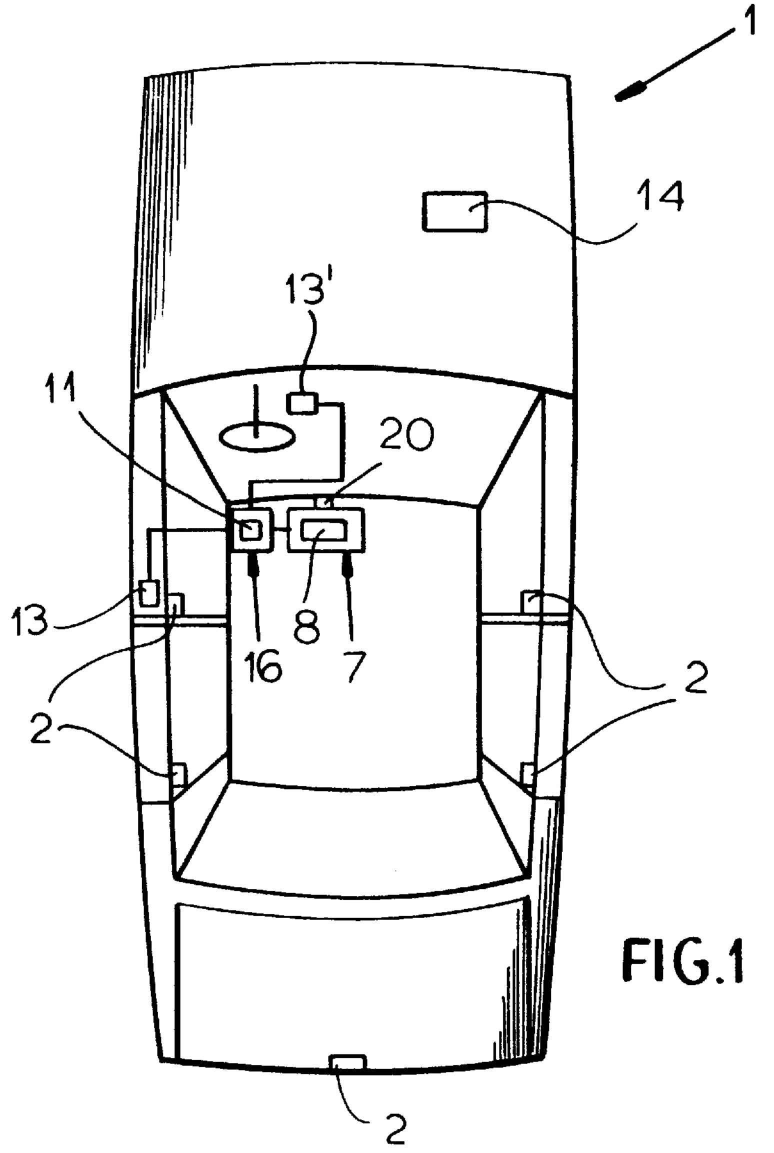
FIG. 1 is a schematic top view of a motor vehicle and central lock system according to the invention.

As seen in FIG. 1 a motor vehicle 1 is equipped with five door latches 2, one on each door and one on the trunk lid. They are all controlled by a central lock controller 14 which in turn can be operated by a driver-side front door lock 13 or by a receiver 7 mounted inside the vehicle and having a decoder 8 and an infrared pickup 20.

Figure 2:
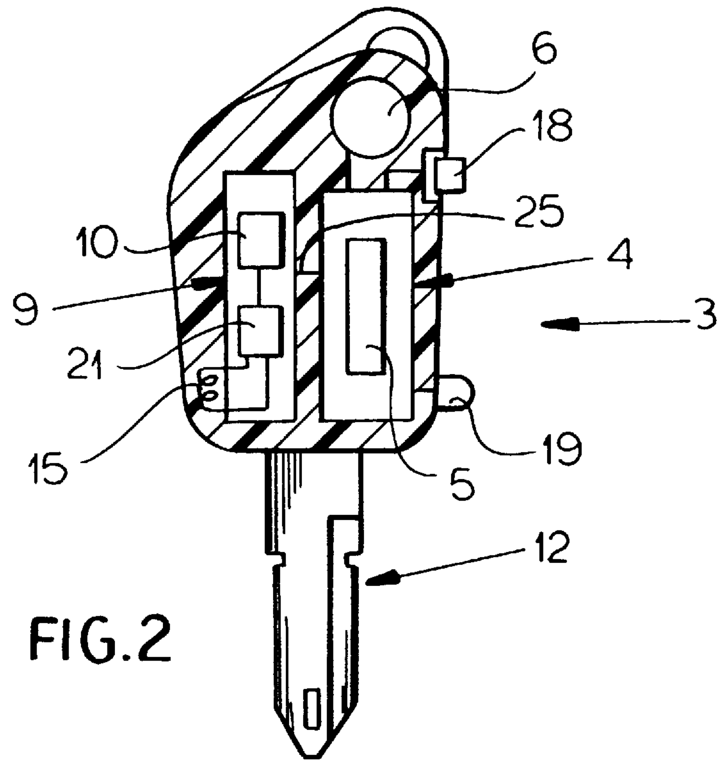
FIG. 2 is a largely schematic sectional view through the key/transmitter of the invention.

A remote operator 3 shown in FIG. 2 can operate this lock 13 and an ignition lock 13' manually and can operate the controller 14 by an infrared link. It has a power source 6 in the form of a small battery that can operate a transmitter 4 including an encoder 5 to emit a coded infrared signal via a diode 19 when a switch button 18 is actuated. A passive transponder 9, that is one without its own power source and not connected to the battery 6, is provided in the operator 3 also with a code-word register 10 and a modem 21 that is connected to an antenna or pickup coil 15 imbedded in the plastic body of the operator 3. A standard bitted key blade 12 extends from the operator 3.

Figure 3:
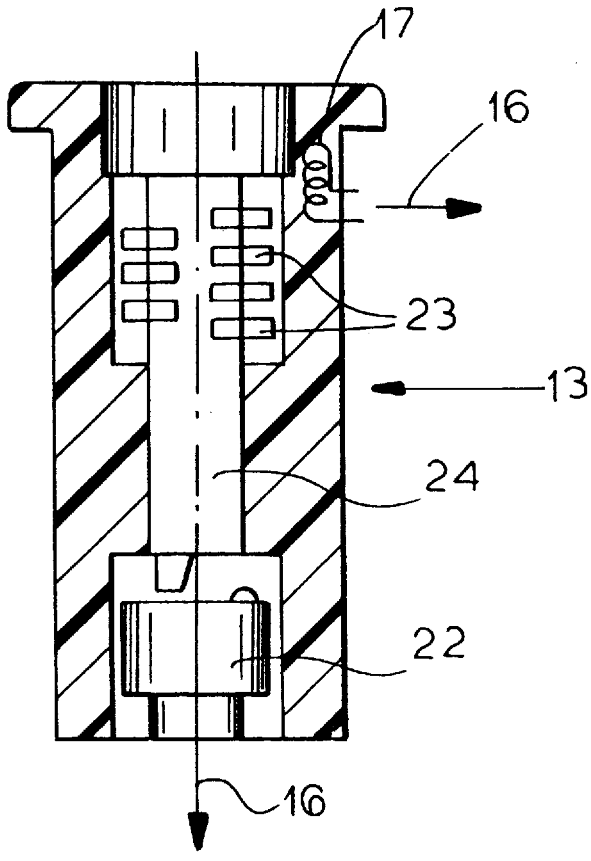
FIG. 3 is a largely schematic sectional view through part of a door lock according to the invention.

The vehicle 1 is provided with the receiver 7 that is intended to work with the transmitter 4 in the manner described in above-cited copending patent application Ser. No. 08/098,481. In addition it has a transceiver 16 with a code-word register 11 that can coact with the transponder 9 via a coil 17 provided in the locks 13 and 13' as shown in FIG. 3. The locks 13 and 13' each have tumblers 23 that coact mechanically with the bitted key blade 12 and a switch 22 that is actuated when the appropriately bitted key is inserted in the lock 13 or 13' and rotated. These switches 22 in turn operate the transceiver 16.

Figure 4:
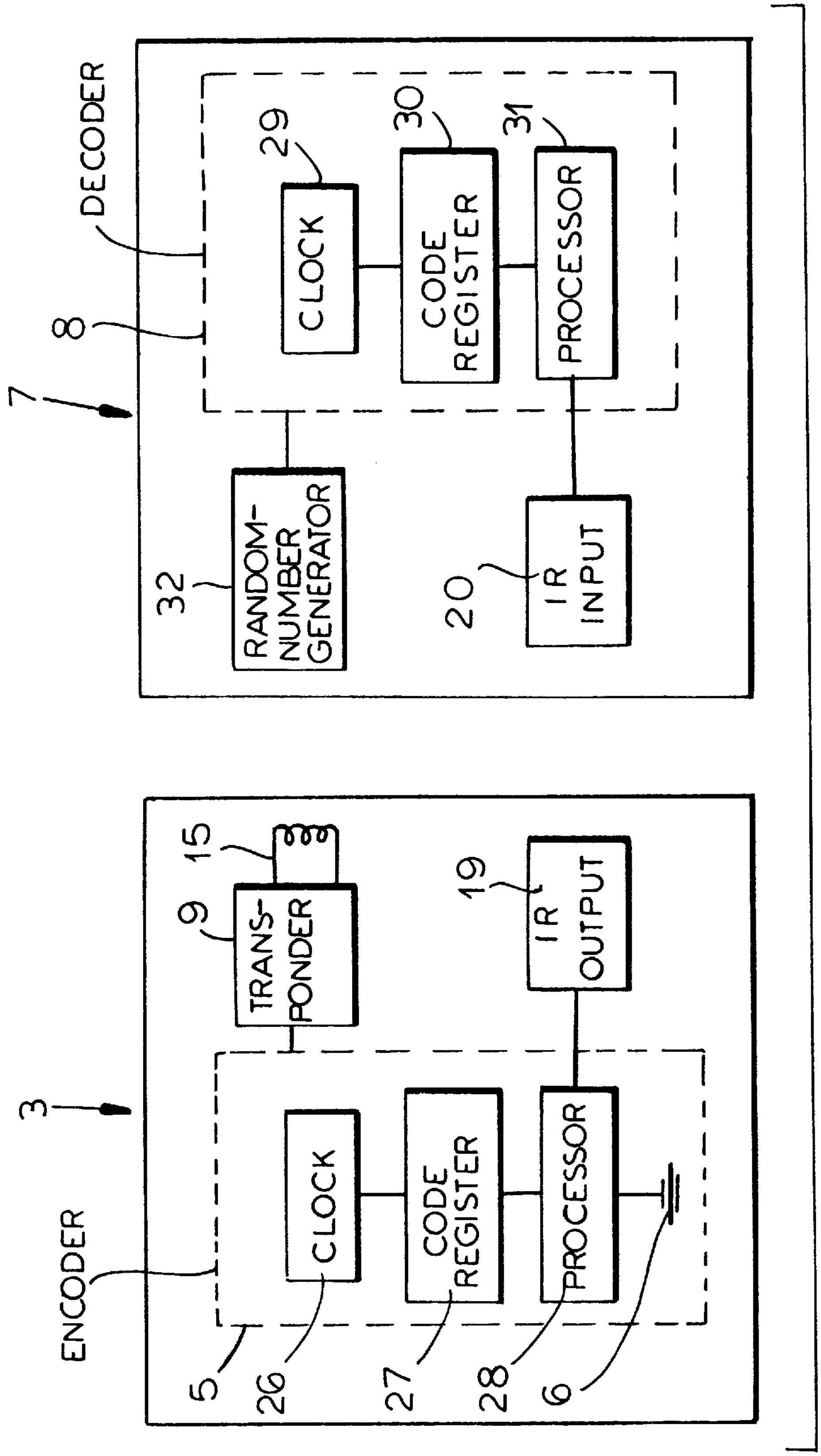
FIG. 4 is a schematic view of elements of the system.

As seen in FIG. 4 the encoder 5 includes a clock 26 connected to a code register 27 and thence to a processor 28 that feeds a modulated signal to the IR output formed by the photodiode 19. The receiver 7 has a clock 29 connected to a code register 30 and thence to a processor 31 connected to the photocell input 20. A random-number generator 32 is provided to initialize the system.

The system described above operates as follows:

Under normal circumstances all that one need to do to open the latches 2 is push the button 18 so as to emit from the diode 19 an infrared signal modulated with a predetermined code word. The signal is picked up by the detector 20 and compared in the receiver 7 with the code word in its register 30 and, if the transmitted code word is the same as the one in this register 30 a release signal is sent to the controller 14 which unlocks the latches. To increase security the systems normally operate as described in the patent application cited immediately above, that is both the encoder 5 of the operator 3 and the register 8 of the receiver 7 are periodically stepped by their respective synchronized clocks 26 and 29 through identical sequences of code words so that, while the word is constantly changing in both the transmitter 4 and receiver 7, they are both the same. Even if the transmitted code word does not exactly agree with the one in the receiver register 8, so long as it is not too far from it in the sequence the appropriate release signal is sent by the receiver 7 to the controller 14.

When, however, synchronization is completely lost or the battery 6 has died, the user must insert the key blade 12 in one of the locks 13 or 13' and rotate it. So long as the blade 12 is appropriately bitted, the barrel 24 of the lock 13 or 13' will turn and the switch 22 will be operated to actuate the transceiver 16. It will send a predetermined code word via the coil 17 to the coil 15, which also serves as a pickup for electrical energy, and the modem 21 will pass it to the code-word register 10. If the code-word signal from the transceiver 7 agrees with the code word in the transponder's register, the transponder 9 will respond and emit another code word that will be picked up by the transceiver 7 and compared to what is in its register 11. If this agrees with the set code word in the register 11, a release signal is sent to the controller 14 to open the latches 2.

At the same time that the release signal is emitted, the transceiver 7 initiates a time period, that is a window normally several seconds long. If during this time period the button 18 is pressed, whatever code word the operator 3 emits will be received and the receiver 7 will be reset to it. Thus if the battery is changed or synchronization is lost, the user can easily reset the receiver simply by inserting his or her key, turning it, and then pushing the button. For safety's sake the system is set up that the code word stored in the receiver can only be reset when the controller 14 is in the locked position.

In other words under normal circumstances the user need merely push the button 18 to get into his vehicle, whereupon the operator 3 is used like a standard key to start the vehicle. If, however, the remote link becomes inoperative, the mechanical key part 12 is used to initiate another type of electrically coded operation to open and/or start the vehicle. Thus even if an unauthorized person gains access to the operator 3 and duplicates the key blade 12, he or she will not be able to get through the higher level of electronic security.

According to the invention the code word used by the transponder 10 is in some way dependent on the code word from the register 8 and is reset each time the transponder 9 is used. In this manner it becomes virtually impossible to get around the double layer of coded electronic security.

The key operator 3 can also have a small serial interface or connection 25 between the transponder 9 and the transmitter 4. It allows one or more additional code words to be loaded into the transponder register 10 which can in turn be checked by the transceiver 16 and compared with additional code words in the transceiver register 11. Preferably the additional code word is one which shows that actual current position of the register of the encoder 5. If synchronization is lost, the serial connection can be used to reset the encoder 5 via the transponder 9 and to allow the transceiver 16 to check on the condition of the transmitter 4. Furthermore the system can be set up so that the engine of the vehicle can only be started after the doors have been unlocked properly.

We claim:

1. A method of operating a motor-vehicle lock system having:

- a remote operator separate from the motor vehicle and having
  - a key part having a predetermined bitting,
  - an energy source,
  - transmitter means powered by the energy source and actuatable to transmit a main signal containing a current main code word, and
  - transponder means substantially independent of the transmitter means and of the energy source for receiving an interrogation signal and thereupon generating a callback signal containing a callback code word;
- a lock provided with a switch and actuatable mechanically by the key part with the predetermined bitting to operate the switch;
- a central controller in the vehicle connected to elements of the vehicle for actuating same;
- receiver means in the motor vehicle connected to the controller for
  - receiving the main signal including the main code word,
  - extracting the current main code word from the transmitted main signal,
  - comparing the extracted current main code word with a predetermined stored main code word, and
  - sending a release signal to the controller when the extracted current main code word corresponds to the predetermined stored main code word to actuate the elements; and
- transceiver means in the motor vehicle and connected to the controller for, when the switch is actuated,
  - generating the interrogation signal,
  - receiving the callback signal containing the callback code word,
  - extracting the callback code word from the callback signal,
  - comparing the extracted callback code word with a predetermined callback code word, and
  - sending a release signal to the controller when the extracted callback code word corresponds to the predetermined callback code word to actuate the elements and setting in the transponder a new callback code word based on the main code word;

the method comprising the steps after exchange of the energy source of:

- inserting the key part in the lock and actuating the switch to generate the interrogation signal in the transceiver;
- generating the callback signal in the operator, receiving the callback signal in the receiver means, extracting the callback code word, comparing the extracted callback code word, and, on correspondence with the extracted callback code word with the predetermined callback code word, initiating a time window of a predetermined length;
- generating with the transmitter means during the time window a main signal including a new current code word; and
- receiving with the receiver means during the time window the new main code word and resetting the stored code word in the receiver to the received new main code word.

2. The method defined in claim 1 wherein the receiver means only resets the stored code word to the new main code word when the central controller is in a locked position.

3. The method defined in claim 1 wherein the switch is actuated by moving the key part in the lock.

* * * * *